May 18, 1954  L. E. THATCHER  2,678,977
SPEED RESPONSIVE SWITCH
Filed Sept. 5, 1952
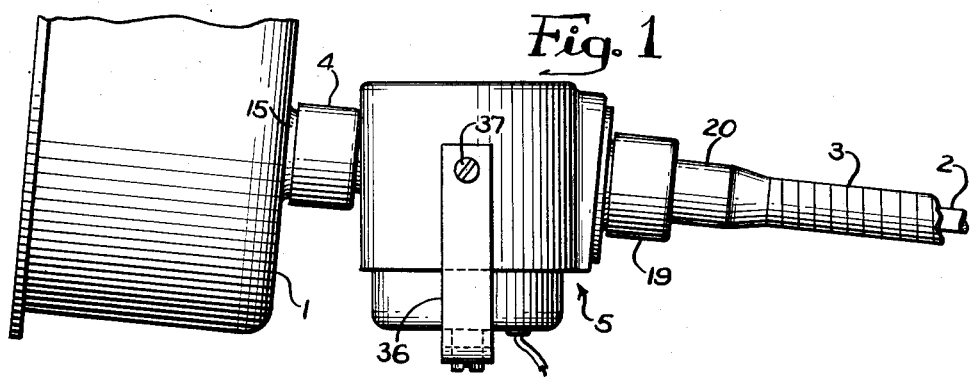
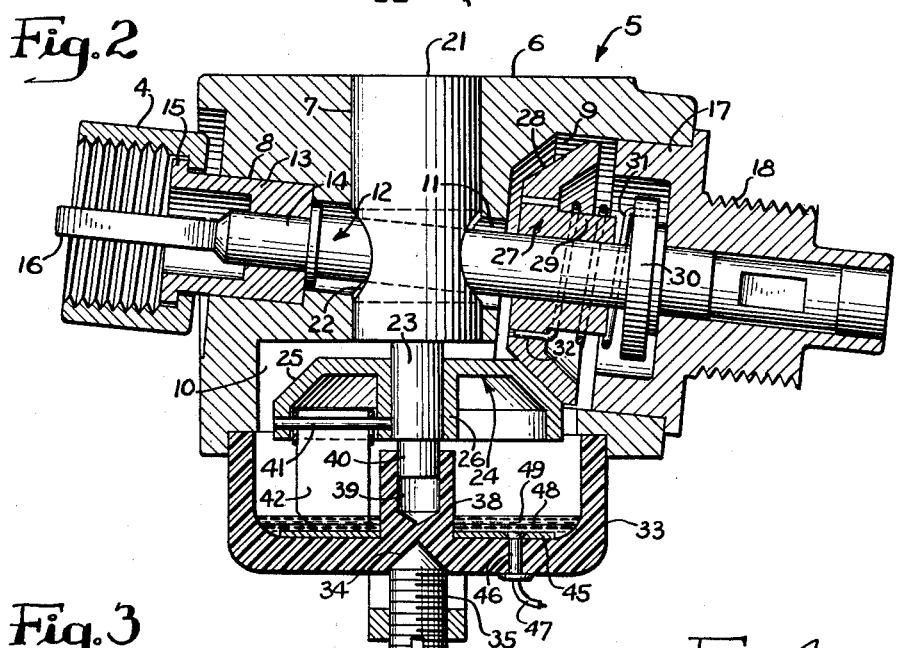
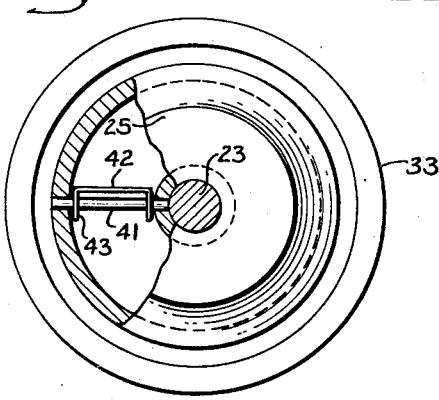
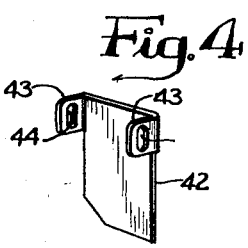
Inventor
Lewis E. Thatcher
by: Gary, Desmond & Parker
Attys.

Patented May 18, 1954

2,678,977

UNITED STATES PATENT OFFICE 2,678,977

SPEED RESPONSIVE SWITCH

Lewis E. Thatcher, Chicago, Ill., assignor to Gaylord Products, Incorporated, Chicago, Ill., a corporation of Delaware Application September 5, 1952, Serial No. 308,085

12 Claims. (Cl. 200—52)

This invention relates to improvements in a mechanism for making or breaking an electric circuit in relation to the speed of a rotating body, and refers specifically to an electric switch which will complete or break an electric circuit in response to the speed of rotation of a shaft.

Devices have heretofore been proposed for making or breaking an electric circuit in response to the speed of rotation of a rotating shaft or body. Such devices have been found to be complicated in their structure and have also been found to be unreliable in operation.

The present invention contemplates an electric switch which employs an entirely new concept in controlling an electric circuit in response to speed of operation of a rotating body or shaft, the device being simple in construction and simple and reliable in operation.

One of the uses to which a device embodying the concepts of the present invention may be put is in the automatic control of the brakes of an automobile, such as, for instance, in conjunction with a so-called anti-creep device for automobiles having automatic transmissions and fluid drives. Such devices are frequently actuated by the energization of a solenoid-operated valve interposed in the fluid brake line of the automobile whereby the electric closing or opening of the valve takes place in response to movement of the vehicle. Movement of the vehicle results in rotation of the conventional speedometer cable and, hence, the device of the present invention may be caused to function by such cable rotation to control the valve in the fluid brake line.

Of course, the present invention is susceptible of use in many other environments and to perform many other functions where an electric circuit is completed or broken, but for purposes of illustration the device will be described as being operated in conjunction with an automobile speedometer cable.

The objects and advantages of the present invention will be apparent from the accompanying drawing and following detailed description.

In the drawing,

Fig. 1 is a side elevational view of the device comprising the present invention employed in conjunction with a speedometer cable.

Fig. 2 is an enlarged sectional view of the improved device.

Fig. 3 is a sectional view taken on line 3—3 of Fig. 2.

Fig. 4 is a detailed perspective view of the contact element employed in the present invention.

Referring in detail to the drawing, 1 indicates diagrammatically a fragmentary portion of the usual automobile speedometer. Normally the speedometer 1 is connected to a flexible cable 2 which is carried within a sheath 3, the sheath 3 being secured to the body of the speedometer 1 by means of a coupling 4.

To illustrate one use of the present invention it is contemplated interposing the device 5, comprising an embodiment of the present invention, between the flexible cable 2 and the speedometer 1. As will be hereinafter more fully described the device 5 comprises essentially an electric switch which makes and/or breaks an electric circuit in response to the rotation of a rotating body. In the environment hereinafter described, the device 5 can be employed to make or break an electric circuit in response to the rotation of the flexible cable 2 which in turn rotates in proportion to the speed of the vehicle upon which the speedometer arrangement is carried. Hence, the device 5 can be employed to make and/or break an electric circuit in response to the speed of an automotive vehicle.

The device 5 comprises a body portion 6 which may conveniently be a metal casting which is cored or machined to provide a central cylindrical recess 7, a lateral recess 8, an opposite lateral recess 9 and a bottom recess 10. The recesses 8 and 9 are connected by a transverse bore 11 in which a shaft 12 is positioned. A bushing 13, preferably constructed of bronze or other suitable bearing material is positioned in the recess 8 and a portion 14 of the shaft 12 is journaled in the bushing. The coupling 4 may be threadedly mounted upon a threaded nipple 15 which may be carried upon the rear wall of the speedometer 1, said coupling functioning to engage an annular flange 15 carried upon the bushing 13. End 16 of shaft 12 connects into the interior of the speedometer 1 whereby rotation of shaft 12 functions to actuate the speedometer.

A rear bushing 17 is positioned in the mouth of recess 9, said bushing also being constructed of bronze or like bearing material. The bushing 17 is provided with a threaded throat 18 which is adapted to be engaged by the internal threads of a coupling 19. The coupling 19 engages the endmost tubular portion 20 of the sheath 3 within which the flexible cable operates. The rear end of shaft 12 is suitably connected to the end of the flexible cable 2 whereby said shaft, journaled in the bushings 13 and 17, is rotated.

A central shaft 21 is immovably positioned in the cylindrical recess 7, said shaft being provided with a transverse opening 22 of a diameter in excess of the diameter of shaft 12. In other words, the shaft 12 passes freely through the stationary shaft 21. The shaft 21 at one end projects into the recess 10, the projecting portion 23 being of relatively restricted diameter. A disc 24 having an annular tapered conical surface 25 and a collar portion 26 is freely mounted upon the projecting portion 23 of the shaft 21, the disc 24 being positioned in the recess 10. A disc 27 having an annular tapered conical surface 28 and a sleeve portion 29 is loosely mounted upon shaft 12 within the recess 9. A plate 30 is rigidly mounted upon the shaft 12 within the recess 9. A plate 30 is rigidly mounted upon the shaft 12 and functions as an anchorage for a coil spring 31 which embraces the collar portion 29 of the disc 27. The opposite end of the coil spring 31 is anchored in a recess 32 provided in the disc 27. The arrangement is such that the disc 27 is driven by the shaft 12 through the agency of the coil spring 31. The tapered surface 28 of the disc 27 is in frictional contact with the tapered surface 25 of the disc 24. Hence, rotation of shaft 12 which rotates the disc 27 imparts rotation to the disc 24 by virtue of the frictional contact of the surfaces 25 and 28.

Although a frictional drive between shaft 12 and the disc 24 is preferred, the discs 27 and 24 may comprise bevel gears if a positive drive is desired.

A cup 33 constructed of an insulating material such as hard rubber, plastic or the like is adapted to be positioned over the mouth of the recess 10. The cup 33 is provided with a conical recess 34 at its central portion, said recess being adapted to receive the dog point of a set screw 35. The set screw 35 may be threadedly carried by a U-shaped strap 36 which may be secured as by screws 37 to the body 6. By means of the set screw 35 the cup 33 may be securely seated over the mouth of recess 10.

A boss 38 constructed integral with cup 33 extends upwardly from the interior of the cup at its central portion, said boss being provided with a central bore 39 which is adapted to receive an end portion 40 of the restricted shaft 23 upon which the disc 24 is journaled.

A pivot pin 41 is secured radially upon the disc 24, said pin extending from the peripheral portion of the disc to the collar portion 26 thereof. A contact member 42, constructed of an electrically conductive material such as sheet copper or the like, carries an opposite pair of ears 43. Each of said ears is provided with an elongated slot 44. The arrangement is such that the pin 41 functions as a support for the contact member 42, said pin extending through the elongated slots 44 provided in the ears 43.

In the inner bottom portion of cup 33 an electrically conductive plate 45 is positioned, said plate being connected by means of rivet 46 to an electrical conductor 47. In employing the present device a quantity of mercury 48 may be positioned within the cup 33 and normally provides a pool of mercury in said cup of a predetermined thickness, the mercury being in electrical contact with the plate 45. On top of the mercury is a pool of non-conductive liquid material such as oil 49 which, as will be hereinafter more fully described, may be of a desired viscosity and may be positioned in the cup at a desired depth.

In utilizing the present invention motion of the vehicle upon which the speedometer 1 is mounted results in rotation of the flexible cable 2. Inasmuch as the cable 2 is connected to shaft 12 said shaft will be rotated thereby actuating the speedometer. Simultaneously the disc 27 will be driven by the shaft 12 which in turn drives the disc 24. In normal circumstances, that is, when the disc 24 is stationary the contact strip 42 rests in the pool of mercury 48 and if desired the lower edge of the strip 42 may likely rest upon the plate 45 although when a mercury pool is used this latter contact is not necessary to the operation of the device since contact will be made between the strip 42 and plate 45 by the mercury. When the shaft 12 rotates with motion of the vehicle and the disc 24 is rotated, the end portion of the contact strip 42 will move through the bath of mercury and oil carried in the cup 33. When the speed of rotation of the disc 24 reaches a predetermined amount the end portion of the contact strip 42 will rise as the rotation proceeds and will eventually be raised to the point where it no longer makes contact with the mercury pool 48. At this period of rotation electrical contact is broken between the conductive strip 42 and the mercury pool 48. To take advantage of this electrical switch action the body of the device including the disc 24 may be grounded electrically. The conductor 47 may be connected to the low tension portion of the electrical circuit. Hence, when electrical contact is broken between the strip 42 and the mercury 48 the circuit is broken between the high tension portion 47 and the grounded portion of the electrical circuit. It is to be understood, of course, that the electrical circuit may include any desired electrically operated signal or actuating device such, for instance, as a solenoid operated valve in the brake line of the automobile. Hence, the device 5 may be employed as a speed responsive switch to actuate or release the brakes of the vehicle at certain periods of operation.

Various factors may be controlled in order to control the criticalness of operation of the switch. For instance, the weight of the contact strip 42 may be varied to change the time when the strip would break contact with the mercury pool. If the contact strip 42 is relatively heavy contact will be broken with the mercury pool when the disc 24 reaches a relatively high speed. Conversely, if the weight of the strip 42 is relatively light, relatively slow rotation of the disc 24 will cause the strip to break contact with the mercury pool 48. In addition, with a strip 42 or predetermined weight the relationship between the speed of rotation of the disc 24 and the breaking of contact of the strip with the mercury pool, may be varied by changing the viscosity of the oil bath 49. If the viscosity of the bath 49 is relatively high, a relatively low rate of rotation of the disc 24 will cause contact to be broken. If, on the other hand, the viscosity of the oil is relatively low, contact will be broken at a higher speed of the disc 24. Further, this relationship may be altered by varying the depth of the oil bath 49 in the cup 33. With a relatively great depth contact will be broken at a relatively slow speed of the disc 24 and conversely with a relatively shallow depth of the oil contact will be broken at a higher speed of the disc.

In order that the strip 42 acting in conjunction with the pool of mercury 48 will function as an electrical switch regardless of rotation of the disc 24 the elongated slots 44 are provided in ears 43. It can readily be seen that when the disc 24 is rotating in a predetermined direction the strip 42, being longer than the distance between the pivot pin 41 and plate 45, will be canted at an angle whereby the lower edge portion of the strip will lag behind the position of the pivot pin 41 and said pivot pin will be disposed at the upper portion of the slots 44. If rotation of the disc 24 is reversed, the lower edge of the disc will contact plate 45 and the strip 42 will be moved upwardly. This upward movement of the strip is accommodated by the provision of the elongated slots 44, permitting the strip 42 to pass the dead center position. Thereafter, the lower edge of the disc will lag behind the pivot pin 41 in the reverse direction and will function in the reverse direction in the same manner that has been hereinbefore described.

It will be noted that in the device 5 the shaft 12 is disposed at an angle other than a right angle to the axis of the shaft 21. This is merely a special arrangement which can be conveniently employed where a device is used with a conventional speedometer since with the conventional speedometer, the speedometer cable enters the body of the speedometer at an angle of approximately 5° below the horizontal. If the device 5 is to be used in a different environment it is contemplated that the shaft 12 may be disposed at right angles to the shaft 21 or at any other angle. However, in all cases it is desirable that the shaft 21 be disposed vertically. In disposing the shaft 21 vertically, the shaft 12 may assume any desired angular relationship thereto dictated by the environment in which the device is used.

Although the present device has been shown and described as employing a mercury pool 48 beneath the non-conductive liquid pool 49, it may be desirable to employ the device without the use of the mercury pool. In this case the lower end of the strip 42 will make direct contact with the upper surface of the conductive plate 45 and at a predetermined speed of rotation the non-conductive liquid will deflect the strip, raising its end out of contact with the plate.

As another alternative, the advantage of the good electrical contact afforded by the use of the mercury pool may be secured without the disadvantage of a movable pool of mercury, by heavily coating the contacting end of the strip 42 with mercury and heavily coating the upper surface of the plate 45 with mercury. The coating of mercury upon the strip 42 and plate 45 may be made relatively heavy without having the mercury in a flowable condition and yet the contact of the two mercury coated members may be substantially such as afforded by a liquid mercury pool. Of course, in all cases a non-conductive liquid pool 49 will be used to deflect the strip 42 at a predetermined speed.

Of course, it is to be understood that the present device may be employed for substantially any purpose wherein the relationship of speed, particularly speed of rotation, and the making or breaking of an electrical circuit is desirable. Further, the device may be used in conjunction with any type of rotating body and is not to be specifically limited to its use with a speedometer cable.

I claim as my invention:

1. An electric switch responsive to the rotary speed of a body which comprises, a container, an electrically conductive member carried in the container, a pool of electrically non-conductive liquid carried in the container in contact with and above the conductive member, an electrically conductive element, means for pivotally suspending said element above said electrically conductive member with a free end portion thereof dipping in said non-conductive pool and in contact with said electrically conductive member when said element is stationary, means for rotating said element in a plane substantially parallel to said pool to cause the free end portion of said element to be deflected by friction between said non-conductive pool and said element to cant the said free end portion away from and out of contact with said conductive member, and means for including the conductive member and conductive element in an electric circuit.

2. An electric switch responsive to the rotary speed of a body which comprises, a container, a pool of mercury carried in the container, a pool of electrically non-conductive liquid carried in the container in contact with and above the mercury pool, an electrically conductive element, means for pivotally suspending said element above said pools with a free end portion thereof dipping in said mercury pool when said element is stationary, means for rotating said element in a plane substantially parallel to said pools to cause the free end portion of said element to be deflected by friction between said non-conductive pool and said element to cant the said free end portion away from and out of contact with said mercury pool, and means for including the mercury pool and conductive element in an electric circuit.

3. An electric switch responsive to the rotary speed of a body which comprises, a container, electrically conductive means carried in the container, a pool of electrically non-conductive liquid carried in the container in contact with and above said electrically conductive means, an electrically conductive element of greater width and length than thickness, means for pivotally suspending said element above said pool with a free end portion thereof dipping in said non-conductive liquid pool and in electrical contact with said electrically conductive means when said element is stationary, means for rotating said element transversely to its greatest area in a plane substantially parallel to said pool surface to cause the free end portion of said element to be deflected by friction between said non-conductive pool and said element to cant the said free end portion away from and out of contact with said electrically conductive means, and means for including the electrically conductive means and conductive element in an electric circuit.

4. An electric switch responsive to the rotary speed of a body which comprises, a container, a pool of mercury carried in the container, a pool of electrically non-conductive oil of predetermined viscosity carried in the container in contact with and above the mercury pool, an electrically conductive element, means for pivotally suspending said element above said pools with a free end portion thereof dipping in said mercury pool when said element is stationary, means for rotating said element in a plane substantially parallel to said pools to cause the free end portion of said element to be deflected by friction between said oil pool and said element to cant the said free end portion away from and out of contact with said mercury pool, and means for including the mercury pool and conductive element in an electric circuit.

5. An electric switch mechanism comprising a body, a shaft journaled for rotation in said body, a rotatable member carried in said body, means on said shaft for rotating said member, a container carried by said body beneath said rotatable member, an electrically conductive plate positioned in said container, a pool of electrically non-conductive material carried in said container in contact with and above the electrically conductive plate, an electrically conductive element pivotally suspended from said rotatable member above said pool with the free end thereof dipping in said pool and in contact with said plate when the member is stationary, means for connecting said shaft to a rotating body to rotate said member and move said element in a plane substantially parallel to said pool surface to cause the free end portion of said element to be deflected by friction between said non-conductive pool and said element to cant the said free end portion away from and out of contact with said electrically conductive plate, and means for including the electrically conductive plate and conductive element in an electric circuit.

6. An electric switch mechanism comprising a body, a shaft journaled for rotation in said body, a rotatable disc carried in said body drive means on said shaft for rotating said disc, a container carried by said body beneath said rotatable disc, a metal plate positioned in said container, a pool of electrically non-conductive material carried in said container in contact with and above the metal plate, an electrically conductive element pivotally suspended from said rotatable disc above said pool with the free end thereof dipping in said pool and in electric contact with said metal plate when the disc is stationary, means for connecting said shaft to a rotating body to rotate said disc and move said element in a plane substantially parallel to the surface of said pool to cause the free end portion of said element to be deflected by friction between said non-conductive pool and said element to cant the said free end portion away from and out of electrical contact with said metal plate, and means for including the metal plate and conductive element in an electric circuit.

7. An electric switch mechanism comprising a body, a shaft journaled for rotation in said body, a rotatable disc carried in said body, friction drive means on said shaft for frictionally rotating said disc, a container carried by said body beneath said rotatable disc, an electrically conductive plate positioned in said container, a pool of electrically non-conductive material carried in said container in contact with and above the conductive plate, an electrically conductive element suspended from said rotatable disc above said pool with a free end thereof dipping in said pool and in electrical contact with said conductive plate when the disc is stationary, means for connecting said shaft to a rotating body to rotate said disc and move said element in a plane substantially parallel to the surface of said pool to cause the free end portion of said element to be deflected by friction between said non-conductive pool and said element to cant the said free end portion away from and out of contact with said conductive plate, and means for including the conductive plate and conductive element in an electric circuit.

8. An electric switch mechanism comprising a body, a shaft journaled for rotation in said body, a rotatable member journaled in said body, means on said shaft for rotating said member, a container carried by said body beneath said rotatable member, a mercury coated metal plate positioned in said container, a pool of electrically non-conductive oil carried in said container in contact with and above the mercury coated metal plate, a pivot pin carried by said rotatable member, an electrically conductive plate pivotally suspended from said pivot pin above said pool with the free end thereof dipping in said pool and in electrical contact with said mercury-coated metal plate when the element is stationary, said free end of said electrically conductive plate being coated with mercury, means for connecting said shaft to a rotating body to rotate said member in a direction transverse to the length of the pivot pin and move said electrically conductive plate in a plane substantially parallel to the surface of said pool to cause the free end portion of said element to be deflected by friction between said non-conductive pool and said element to cant the said free end portion away from and out of contact with said mercury coated metal plate, and means for including the mercury coated metal plate and conductive plate in an electric circuit.

9. An electric switch mechanism comprising a body, a shaft journaled for rotation in said body, a rotatable disc carried in said body, means on said shaft for rotating said disc, a container carried by said body beneath said rotatable disc, electrical contact means positioned in said container, a pool of electrically non-conductive oil carried in said container in contact with and above said electrical contact means, a pivot pin carried by said disc, an electrically conductive plate pivotally suspended from said pivot pin above said pool with the free end thereof dipping in said pool and in electrical contact with said electrical contact means when the disc is stationary, said plate being movable a predetermined distance transversely to said pivot pin, means for connecting said shaft to a rotating body to rotate said disc and move said plate in a plane substantially parallel to the surface of said pool to cause the free end portion of said element to be deflected by friction between said non-conductive pool and said element to cant the said free end portion away from and out of contact with said electrical contact means, and means for including the electrical contact means and conductive plate in an electric circuit.

10. An electric switch mechanism comprising a body, a member carried in said body for rotation in a substantially horizontal plane, a container carried by said body beneath said rotatable member, an electrically conductive member disposed substantially horizontally in said container and spaced beneath said rotatable member, a pivot pin radially disposed upon said rotatable member, an electrically conductive strip transversely pivoted upon said pivot pin and of a length greater than the distance of said pivot pin from the electrically conductive member, said pivotal connection between said strip and said pivot pin being such as to permit limited longitudinal movement of said strip transversely to said pivot pin and vertical disposition of said strip during reverse rotation of said rotatable member, a pool of non-conductive liquid carried in said container above said electrically conductive member into which the lower end portion of said strip dips and which cants said strip during rotation of said rotatable member to move said lower end portion of the strip out of contact with said electrically conductive member, and means for including said electrically conductive member and said strip in an electric circuit.

11. An electric switch responsive to the rotary speed of a body which comprises, a container, an electrically conductive member carried in said container, a pool of electrically non-conductive liquid carried in the container in contact with and above the conductive member, said body being rotatable in a plane substantially parallel to said conductive member and above said pool of liquid, an electrically conductive element carried by said body and having a movable depending end portion dipping in said liquid and in contact with said electrically conductive member when said body is stationary, means for rotating said body to rotate said element whereby said liquid exerts a thrust upon said element when said body reaches a predetermined speed moving said end portion out of contact with said conductive member, and means for connecting said conductive member and said element to opposite sides of an elctric circuit.

12. An electric switch responsive to the rotary speed of a body which comprises, a container, an electrically conductive member carried in the container, a pool of electrically non-conductive liquid carried in the container in contact with and above the conductive member, an electrically conductive element, means for suspending said element above said pool with a movable free end portion thereof dipping in said non-conductive pool and in contact with said electrically conductive member when said element is stationary, means for rotating said element in a plane substantially parallel to said pool to cause the free end portion thereof to be deflected by friction between said non-conductive pool and said element to cant the said free end portion away from and out of contact with said conductive member, and means for including the conductive member and conductive element in an electric circuit.

References Cited in the file of this patent

UNITED STATES PATENTS

| Number | Name | Date |
|---|---|---|
| 2,428,589 | Oandewiel | Oct. 7, 1947 |